United States Patent
Groenewegen et al.

(10) Patent No.: US 12,487,817 B2
(45) Date of Patent: Dec. 2, 2025

(54) SOFTWARE DEVELOPMENT ARTIFACT NAME GENERATION

(71) Applicant: Microsoft Technology Licensing, LLC, Redmond, WA (US)

(72) Inventors: Peter Groenewegen, Sammamish, WA (US); Priyan Vaithilingam, Allston, MA (US); Rohan Jagdish Malpani, Everett, WA (US); Wenbo Wang, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 18/085,283

(22) Filed: Dec. 20, 2022

(65) Prior Publication Data
US 2024/0201983 A1    Jun. 20, 2024

(51) Int. Cl.
*G06F 9/44*      (2018.01)
*G06F 8/30*      (2018.01)
(Continued)

(52) U.S. Cl.
CPC . *G06F 8/73* (2013.01); *G06F 8/30* (2013.01)

(58) Field of Classification Search
CPC .... G06F 8/20; G06F 8/30; G06F 8/73; G06N 20/10; G06N 5/01; G06N 3/09; G06N 3/0895; G06N 3/088
See application file for complete search history.

(56) References Cited

U.S. PATENT DOCUMENTS

| | | |
|---|---|---|
| 2017/0351512 A1 | 12/2017 | Iwanir et al. |
| 2019/0227774 A1 | 7/2019 | Banuelos et al. |

(Continued)

FOREIGN PATENT DOCUMENTS

| | | | | |
|---|---|---|---|---|
| WO | WO-2022089188 A1 * | 5/2022 | ............... | G06F 8/33 |
| WO | WO-2022093250 A1 * | 5/2022 | ............... | G06F 8/36 |

OTHER PUBLICATIONS

Yuzhan Ma, Automatic Classification of Software Artifacts in Open-Source Applications, 2018, pp. 414-423. https://ieeexplore.ieee.org/stamp/stamp.jsp?tp=&arnumber=8595225 (Year: 2018).*

(Continued)

*Primary Examiner* — Mongbao Nguyen
(74) *Attorney, Agent, or Firm* — Wade IP Law PLLC

(57) ABSTRACT

Some embodiments use specialized machine learning models to generate computing system artifact names which reflect actions, states, conditions, or other aspects of artifact functionality. Artifact creation mechanisms such as method extraction mechanisms, test creation mechanisms, and template extraction mechanisms are enhanced with functionality by which they obtain and suggest meaningful generated names for new artifacts instead of merely prompting users with placeholder names. Specified artifact name formats and name styles are matched during name generation, thereby improving code maintainability and software development efficiency. Generated names are automatically and proactively derived from artifact source code by code summarization, conditional statement location, algorithm category recognition, or name format matching, for example. Generated names are also derived from natural language descriptions in comments and other documentation. Naming gaps left by autocompletion mechanisms are reduced. Inconsistencies between updated artifacts and their names are detected and remedied.

20 Claims, 3 Drawing Sheets

(51) Int. Cl.
  *G06F 8/73* (2018.01)
  *G06F 9/445* (2018.01)
  *G06F 9/455* (2018.01)

(56) References Cited

U.S. PATENT DOCUMENTS

| | | | |
|---|---|---|---|
| 2020/0293164 A1* | 9/2020 | Lee | G06F 40/14 |
| 2020/0349208 A1* | 11/2020 | Bajaj | G06F 16/951 |
| 2020/0380415 A1* | 12/2020 | Siracusa | G06F 8/35 |
| 2021/0173760 A1* | 6/2021 | Downie | G06F 11/3664 |
| 2021/0271455 A1* | 9/2021 | Svyatkovskiy | G06N 3/047 |
| 2021/0279042 A1* | 9/2021 | Allamanis | G06N 3/049 |
| 2022/0058019 A1* | 2/2022 | Wright | G06F 8/75 |
| 2022/0236971 A1* | 7/2022 | Zhang | G06F 8/447 |
| 2022/0317979 A1 | 10/2022 | Araujo Soares | |
| 2022/0358286 A1 | 11/2022 | Wilson-Thomas | |
| 2022/0391541 A1* | 12/2022 | Novotny | G06F 8/41 |
| 2023/0033364 A1* | 2/2023 | Khullar | G06N 3/044 |
| 2023/0153546 A1* | 5/2023 | Peleg | G06F 40/289 704/9 |

OTHER PUBLICATIONS

Aquilas Tchanjou Njomou, MSR4ML: Reconstructing Artifact Traceability in Machine Learning Repositories, 2021, pp. 536-540. https://ieeexplore.ieee.org/stamp/stamp.jsp?tp=&arnumber=9426012 (Year: 2021).*
Fu et al. (WO2021225691 A1), 2021, pp. 1-47. (Year: 2021).*
Wang et al. (WO20220891188 A1), 2022, pp. 1-27. (Year: 2022).*
Sakir Yucel, Contextual Search for Software Engineering, 2016, pp. 1-6. https://ieeexplore.ieee.org/stamp/stamp.jsp?tp=&arnumber=7881385 (Year: 2016).*
Abdallah Atouani, Artifact and Reference Models for Generative Machine Learning Frameworks and Build Systems, 2021, pp. 1-14. https://dl.acm.org/doi/pdf/10.1145/3486609.3487199 (Year: 2021).*
Patricia Jablonski, CReN: A Tool for Tracking Copy-and-Paste Code Clones and Renaming Identifiers Consistently in the IDE, 2007, pp. 1-5. https://dl.acm.org/doi/pdf/10.1145/1328279.1328283 (Year: 2007).*
Yuzhan Ma, Automatic Classification of Software Artifacts in Open-Source Applications, 2018, pp. 1-12. https://ieeexplore.ieee.org/stamp/stamp.jsp?tp=&arnumber=8595225 (Year: 2018).*
English translation, Sharma et al. (WO 2022093250 A1), 2022, pp. 1-19. (Year: 2022).*
"PROSE—Microsoft Research", Retrieved from the Internet: URL: https://web.archive.org/web/20221209221057/ https://www.microsoft.com/en-us/research/group/prose/, Dec. 9, 2022, 02 Pages.
International Search Report and Written Opinion received for PCT Application No. PCT/US23/081226, Mar. 21, 2024, 15 pages.
"Extract a method refactoring", retrieved from << https://learn.microsoft.com/en-us/visualstudio/ide/reference/extract-method?view=vs-2022 >>, Apr. 29, 2022, 3 pages.
Hugo Duprez, "Figma Autoname", retrieved from << https://www.figma.com/community/plugin/1160642826057169962/Figma-Autoname >>, Nov. 13, 2022, 4 pages.
Mohammad Suleman, "How to Automatically Rename all Layers of Figma Design in 1 Click", retrieved from << https://www.ilovefreesoftware.com/09/tutorial/how-to-automatically-rename-all-layers-of-figma-design-in-1-click.html >>, Nov. 9, 2022, 5 pages.
"Generate code", retrieved from << https://www.jetbrains.com/help/idea/generating-code.html >>, Oct. 3, 2022, 11 pages.
"Abstract syntax tree", retrieved from << https://en.wikipedia.org/wiki/Abstract_syntax_tree >>, Aug. 10, 2022, 5 pages.
Yuxiang Zhu, Minxue Pan, "Automatic Code Summarization: A Systematic Literature Review", retrieved from << https://arxiv.org/pdf/1909.04352.pdf >>, Oct. 13, 2019, 12 pages.
Duncan Lew, "Explain and Translate Your Code With GitHub Copilot", retrieved from << https://duncanlew.medium.com/explain-and-translate-your-code-with-github-copilot-39f4e8a9ecb2 >>, Aug. 21, 2022, 9 pages.
"Auto Comment", retrieved from << https://marketplace.visualstudio.com/items?itemName=AkvelonPrimary.autocomment >>, no later than Nov. 30, 2022, 2 pages.
"Automatically Generating Comments for Arbitrary Source Code", retrieved from << https://twosixtech.com/automatically-generating-comments-for-arbitrary-source-code/ >>, no later than Nov. 30, 2022, 8 pages.
"Automatic summarization", retrieved from << https://en.wikipedia.org/wiki/Automatic_summarization >>, Nov. 22, 2022, 15 pages.
"How to: Create item templates", retrieved from << https://learn.microsoft.com/en-us/visualstudio/ide/how-to-create-item-templates?view=vs-2022 >>, Sep. 1, 2022, 4 pages.
"Distance metric for source code", retrieved from << https://stats.stackexchange.com/questions/345767/distance-metric-for-source-code >>, May 11, 2018, 2 pages.
"Picking good identifier names", retrieved from << https://stackoverflow.com/questions/841888/picking-good-identifier-names >>, May 8, 2009, 10 pages.
"Helping developers break through the enigma of code", retrieved from << https://denigma.app/#demo >>, Dec. 1, 2022, 13 pages.
"Switch statement", retrieved from << https://en.wikipedia.org/wiki/Switch_statement >>, Oct. 7, 2022, 8 pages.
"List of algorithms", retrieved from << https://en.wikipedia.org/wiki/List_of_algorithms >>, Nov. 2, 2022, 27 pagess.
"Code completion", retrieved from << https://www.jetbrains.com/help/idea/auto-completing-code.html >>, Jul. 21, 2022, 24 pages.
"Extract method", retrieved from << https://www.jetbrains.com/help/idea/extract-method.html >>, Jul. 21, 2022, 4 pages.
"Find and replace code duplicates", retrieved from << https://www.jetbrains.com/help/idea/find-and-replace-code-duplicates.html >>, Apr. 7, 2022, 2 pages.
Trisha Gee, "Code Completion", retrieved from << https://blog.jetbrains.com/idea/2020/05/code-completion/ >>, May 13, 2020, 14 pages.
"Prepare for testing", retrieved from << https://www.jetbrains.com/help/idea/testing.html >>, Aug. 11, 2022, 5 pages.
"Deep TabNine: A Powerful AI Code Autocompleter For Developers", retrieved from << https://medium.com/syncedreview/deep-tabnine-a-powerful-ai-code-autocompleter-for-developers-70454a5953fe >>, Jul. 18, 2019, 6 pages.
James Vincent, "This AI-powered autocompletion software is Gmail's Smart Compose for coders", retrieved from << https://www.theverge.com/2019/7/24/20708542/coding-autocompleter-deep-tabnine-ai-deep-learning-smart-compose >>, Jul. 24, 2019, 24 pages.
Mala Gupta, "Everyday refactorings", retrieved from << https://www.youtube.com/watch?v=rPq7fBo5JVs >>, Jul. 1, 2020, 1 page.
Maxim Tabachnyk, "ML-Enhanced Code Completion Improves Developer Productivity", retrieved from << https://ai.googleblog.com/2022/07/ml-enhanced-code-completion-improves.html >>, Jul. 26, 2022, 7 pages.
Karthik, "Why You Really Need Facebook's AROMA code-to-code search and recommendation tool?", retrieved from << https://www.upnxtblog.com/index.php/2019/05/06/9-things-about-aroma-code-to-code-search-and-recommendation-tool/ >>, May 6, 2019, 10 pages.
Tamal Das, "9 Best AI-Powered Code Completion for Productive Development", retrieved from << https://geekflare.com/best-ai-powered-code-completion-tools/ >>, Jun. 29, 2022, 13 pages.
International Preliminary Report on Patentability (Chapter I) received for PCT Application No. PCT/US23/081226, mailed on Jul. 3, 2025, 09 pages.

* cited by examiner

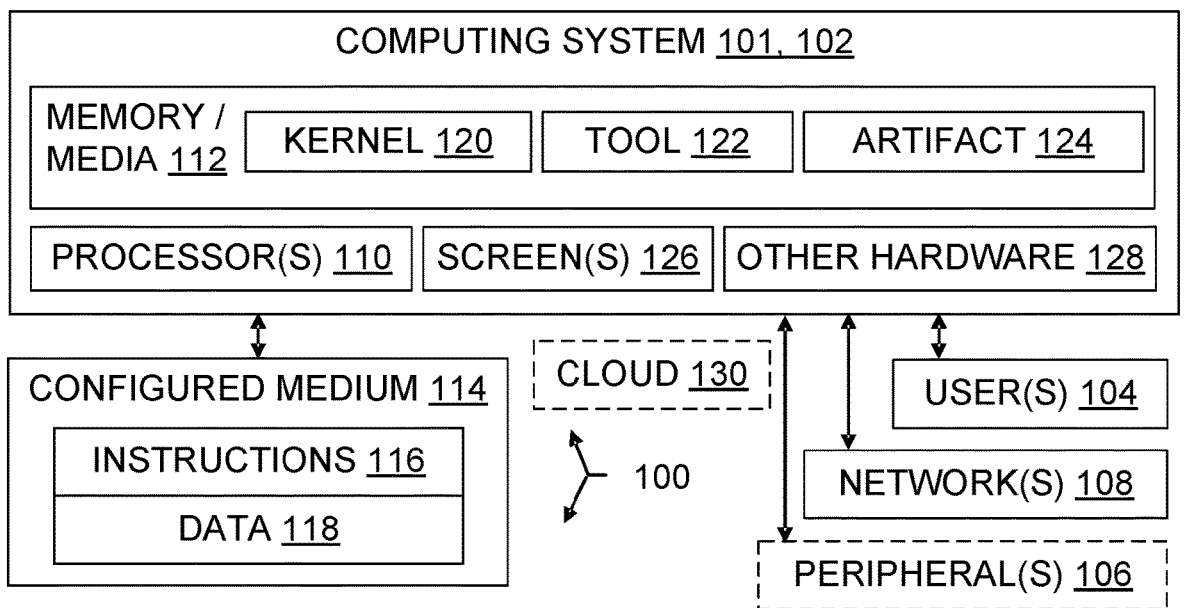
Fig. 1
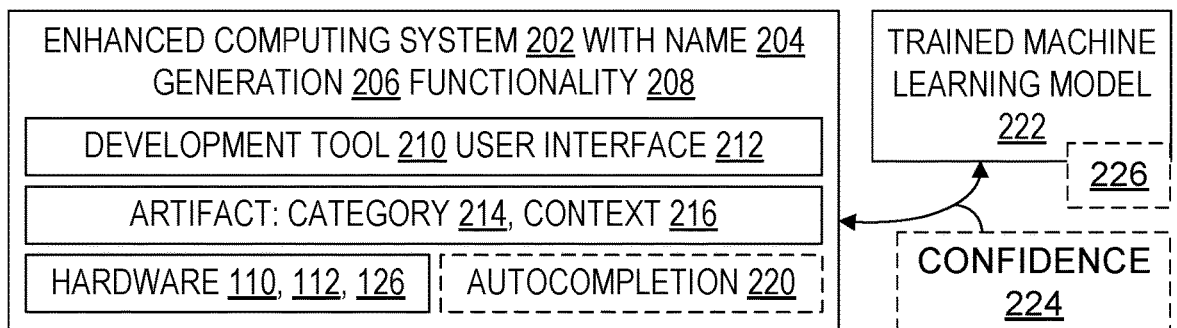
Fig. 2
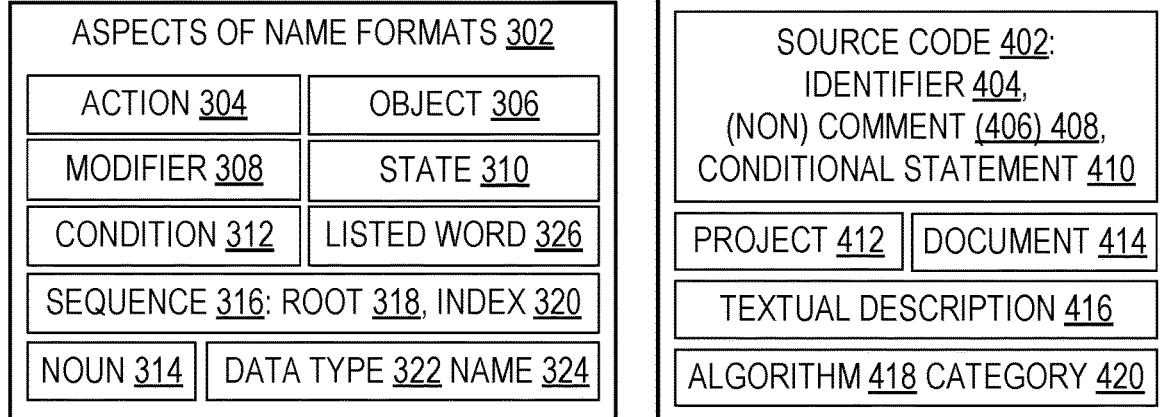
Fig. 3
Fig. 4

SOFTWARE DEVELOPMENT ARTIFACT NAME GENERATION

BACKGROUND

Many modern devices in a broad range of fields have some form of computing power, and operate according to software instructions that execute using that computing power. A few of the many examples of devices whose behavior depends on software include cars, planes, ships and other vehicles, robotic manufacturing tools and other industrial systems, medical devices, cameras, inventory management and other retail or wholesale systems, smartphones, tablets, servers, workstations and other devices which connect to the Internet.

The firmware, operating systems, applications and other software programs which guide various behaviors of these and many other computing devices is developed by people who may be known as developers, programmers, engineers, or coders, for example, but are referred to collectively here as "developers". Developers interact with source code editors, compilers, debuggers, profilers and various other software development tools as they develop software, with widespread beneficial effects.

Although many advances have also been made in development tools themselves, improvements in human-computer interaction technologies remain possible, and are worth pursuing.

SUMMARY

Some embodiments described herein address technical challenges related to computer-human interaction, and more particularly challenges related to interactions involving the naming of software artifacts such as methods, blocks of code, code templates, classes, unit tests, variables, or files. The names given to such artifacts may assist developers, or hinder them, independently of whether the names also satisfy technical requirements such as a minimum length or a maximum length, a programming language syntax, and novelty within a scope.

Some embodiments described herein facilitate user interaction with development tools and aid understanding of software under development, by proactively and automatically generating meaningful names for software artifacts. In some embodiments, a trained machine learning model generates candidate names for an artifact, based on the artifact's context, and enhanced development tools present generated names to developers for ratification. Some embodiments complement autocompletion mechanisms by providing names in situations where autocompletion is not available, or by providing more meaningful names than autocompletion would provide, or both.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 1 is a diagram illustrating aspects of computer systems and also illustrating configured storage media, including some aspects generally suitable for systems which provide an artifact name generation functionality;

FIG. 2 is a block diagram illustrating an enhanced system configured with an artifact name generation functionality;

FIG. 3 is a block diagram illustrating aspects of some artifact name formats;

FIG. 4 is a block diagram illustrating some examples of artifact context;

DETAILED DESCRIPTION

Overview

Figure 5:
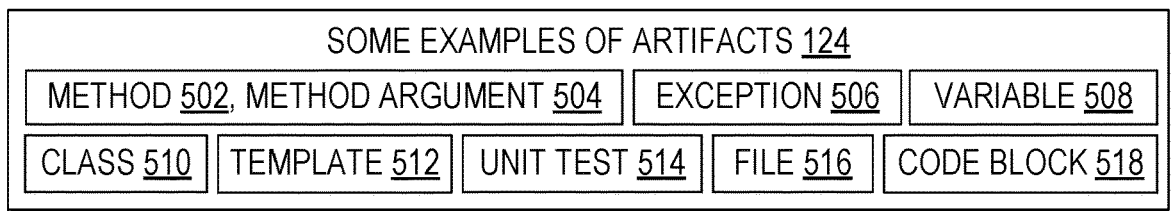
FIG. 5 is a block diagram illustrating some examples of artifacts.

Innovations may expand beyond their origins, but understanding an innovation's origins can help one more fully appreciate the innovation. In the present case, some teachings described herein were motivated by technical challenges faced by Microsoft innovators who were working to improve source code editing tools.

The innovators observed that some tools for editing source code provide a method extraction capability, by which developer-selected lines of source code are extracted into a newly created method. The new method created by the method extraction mechanism is automatically assigned a placeholder name such as "NewMethod" with the expectation that the developer will replace the placeholder name by a better one. The new method can then be called during program execution, both as a replacement for the particular lines of code that were extracted to create the new method, and at other locations in project code. In this way, one copy of the lines of code—the copy inside the new method—replaces multiple copies of the lines of code. This reduction in copies facilitates maintenance, debugging, and understanding of the code, e.g., by reducing or removing the risk of inconsistencies and errors.

The innovators hypothesized that the developer's coding work could be assisted if the editing tool were enhanced so that it proactively automatically generates a suitable name for the new method, instead of simply naming every extracted method "NewMethod" regardless of the actual code that is extracted into the new method. A name generation mockup was discussed. A name based on specific content of the source code being extracted would save a developer from a workflow side trip that would otherwise have been needed to replace the usual placeholder such as "NewMethod" with a name that the developer had to devise and type in.

The innovators concluded that accepting a suitable generated name will be easier for a developer than the alternative of devising and entering a suitable name. Being able to simply accept a suitable name that was generated promptly by a tool is particularly helpful when a developer's attention is on other work, such as designing and editing the code which will call the new method.

Thus, the innovators faced the technical challenge of how to actually implement the mocked-up name generation functionality. This challenge includes at least two constituent challenges: how to objectively determine whether an automatically generated candidate name is a suitable name, and how to automatically generate suitable candidate names. The generated name is a "candidate" in the sense that it is presented to a developer, who may then accept it, modify it, or reject it. The various ways in which embodiments address these and other challenges of artifact name generation will become evident to those of skill in the art upon study of the teachings provided herein.

For example, some embodiments effectively define a candidate name as suitable to name a given artifact when the name distinguishes the artifact from other artifacts based on the artifact's content or other context, instead of being a mere placeholder that is repeated for every new artifact. This aspect of name generation functionality has the benefit of providing artifact names which make program code easier for developers to understand, and thus facilitates software maintenance and debugging.

Some embodiments effectively define a candidate name as suitable to name a given artifact when the name fills a functionality gap left open by a tool's autocompletion capabilities, if any. In some cases, a suitable name for the artifact is not available to the developer via an autocompletion mechanism of a system, and in some cases no autocompletion mechanism is present in the system. This aspect of name generation functionality has the benefit of increasing developer productivity by relieving developers of the work involved in devising and entering a suitable name for the artifact; evaluating and then accepting the candidate generated name is easier and faster.

Some embodiments effectively define a candidate name as suitable to name a given artifact when the name follows a specified meaningful name format such as one of the following formats: an action-object format, an action-modifier-object format, an action-action format, a condition-action format, a modifier-noun format, or a state-to-state format. This aspect of name generation functionality has the benefit of producing generated names that are more meaningful to developers than placeholder names (e.g., "NewMethod") and more meaningful than sequenced names (e.g., "Method001, Method002, Method003, etc.). The relative meaningfulness of generated names versus placeholder names is measurable, e.g., in terms of one or more of saved developer time, adoption of names by developers, adoption of generated name derivatives by developers, developer survey results, or logs of editing activity showing usage of functionality 208, for example.

As for the technical challenge of how to automatically generate names, some embodiments obtain a natural language description of an artifact and then derive the candidate name from the natural language description. Some embodiments locate a conditional statement in a source code of an artifact and then derive the candidate name from the conditional statement. Each of these aspects of name generation functionality has benefits such as producing generated names that are more meaningful to developers than mere placeholder names and merely sequenced names, helping a developer avoid side trips from the main workflow, reducing or avoiding typos, finding inconsistency in names, or finding and remedying a lack of specificity in artifact names.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 130. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 212 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface 212 supports interaction between an embodiment and one or more human users. In some embodiments, the user interface 212 includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 130 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software apps, on mobile devices 102 or workstations 102 or servers 102, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, artifact name generation functionality 208 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

In any later application that claims priority to the current application, reference numerals may be added to designate items disclosed in the current application. Such items may include, e.g., software, hardware, steps, methods, systems, functionalities, mechanisms, data structures, resources, algorithm implementations, or other items in a computing environment, which are disclosed herein but not associated with a particular reference numeral herein. Corresponding drawings may also be added.

More About Systems

FIG. 2 illustrates a computing system 102 configured by one or more of the artifact name generation enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

FIG. 3 shows some aspects of some artifact name formats. This is not a comprehensive summary of all aspects of artifact name formats or all aspects of artifact name generation functionality. Nor is it a comprehensive summary of all aspects of an environment 100 or system 202 or other context of artifact names, or a comprehensive summary of all artifact name generation mechanisms 208 or all artifact name formats 302 for potential use in or with a system 102. FIG. 3 items are discussed at various points herein, and additional details regarding them are provided in the discussion of a List of Reference Numerals later in this disclosure document.

FIG. 4 illustrates some examples of artifact context 216. FIG. 4 is not a comprehensive summary of artifact context 216. FIG. 4 items are discussed at various points herein, and additional details regarding them are provided in the discussion of a List of Reference Numerals later in this disclosure document.

FIG. 5 illustrates some examples of artifacts 124. FIG. 5 is not a comprehensive summary of artifacts 124. FIG. 5 items are discussed at various points herein, and additional details regarding them are provided in the discussion of a List of Reference Numerals later in this disclosure document.

Figure 6:
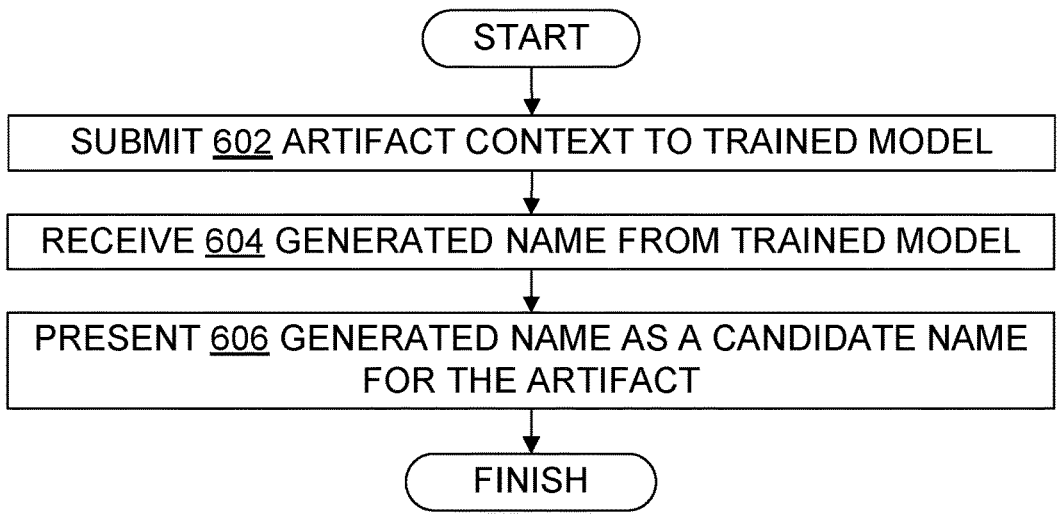
FIG. 6 is a flowchart illustrating steps in some artifact name generation methods, from a perspective outside a module of a machine learning model which is trained to perform name generation based on artifact context.
Figure 7:
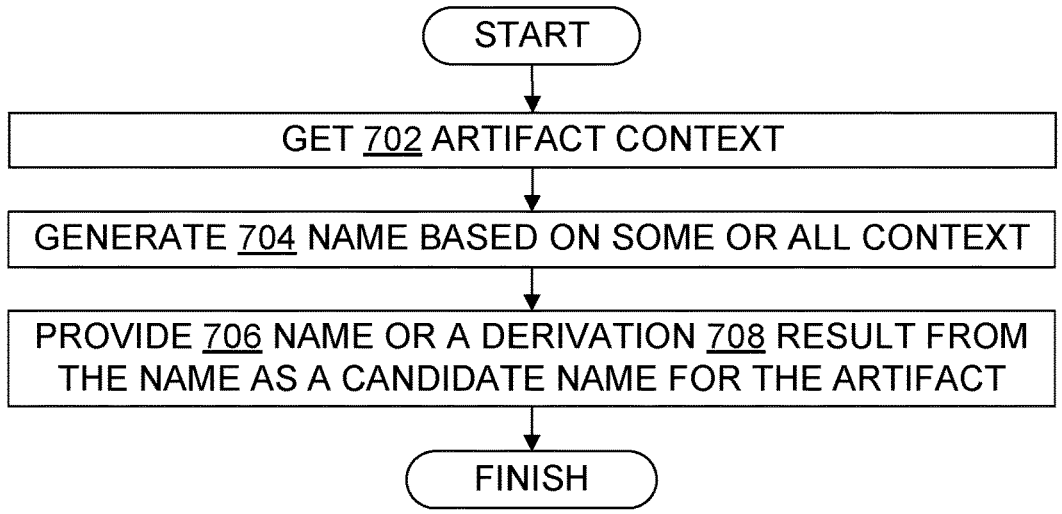
FIG. 7 is a flowchart illustrating steps in some artifact name generation methods, from a perspective inside a module of a machine learning model which is trained to perform name generation based on artifact context.
Figure 8:
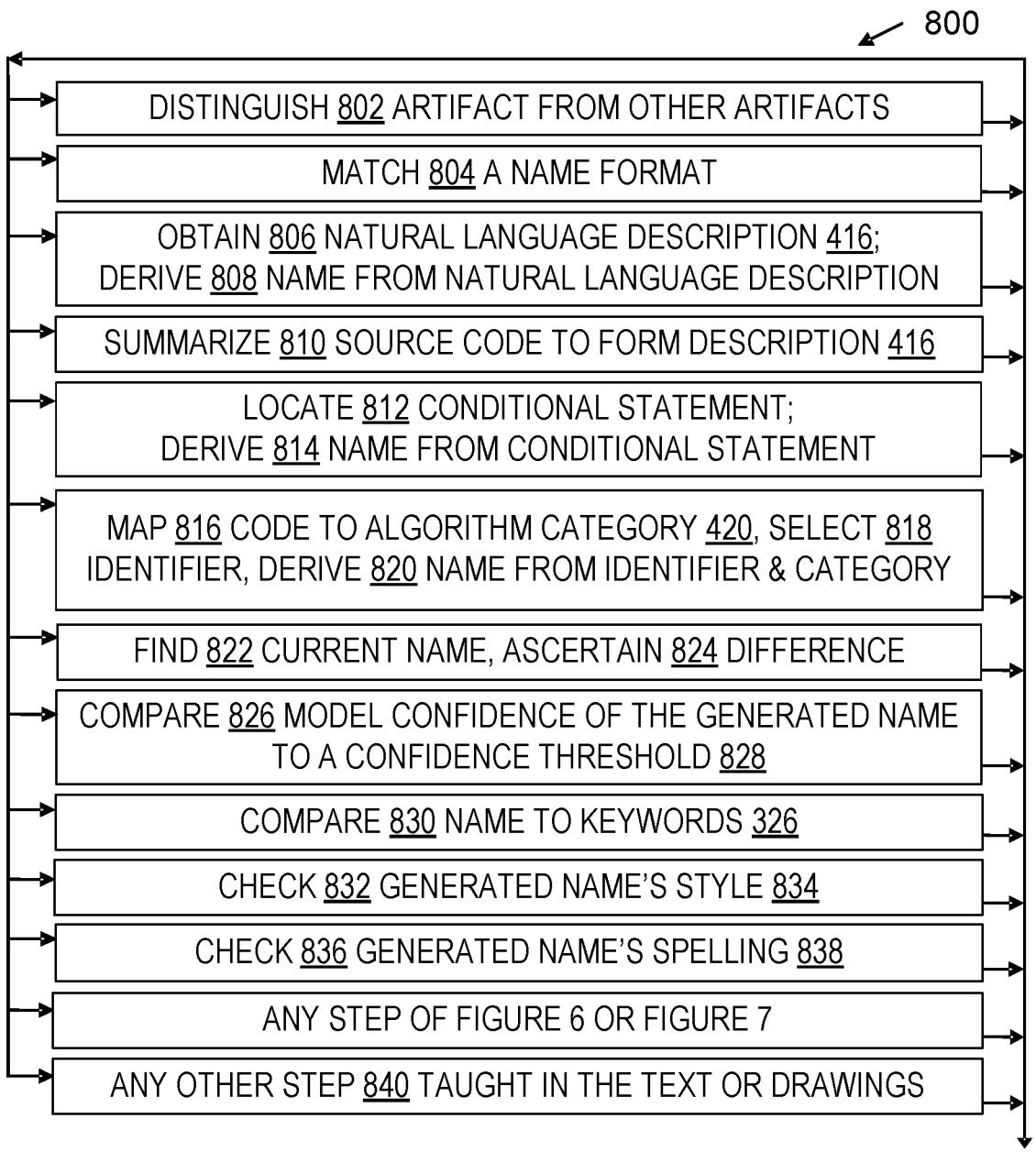
FIG. 8 is a flowchart further illustrating steps in some artifact name generation methods, and incorporating FIGS. 6 and 7.

The other figures are also relevant to systems. FIGS. 6 to 8 illustrate methods of system operation.

In some embodiments, the enhanced system 202 is networked through an interface. In some, an interface includes hardware such as network interface cards, software such as network stacks, APIs, or sockets, combination items such as network connections, or a combination thereof.

Some embodiments include a software development computing system 202 which includes: a digital memory 112 and a processor set 110 including at least one processor, the processor set in operable communication with the digital memory. The system also includes a software development tool 210 which upon execution by the processor set submits 602 a context 216 of a particular software development artifact 124 to a trained machine learning model 222. The particular software development artifact belongs to a category 214 which also includes a plurality of other software development artifacts. The tool 210 receives 604 from the trained machine learning model a generated name 204 and presents 606 the generated name in a user interface 212 as a candidate name 204 of the particular software development artifact. The generated name distinguishes 802 the particular software development artifact from other software development artifacts in the category, and the generated name is not available in the computing system via autocompletion 220.

In some embodiments, the enhanced system 202 further includes the trained machine learning model 222, as oppose to merely communicating with the model 222.

In some embodiments, the digital memory 112 is configured by the generated name 204, and the generated name matches 804 at least one of the following name formats 302: an action 304 object 306 format (action-object format 302); an action 304 modifier 308 object 306 format (action-modifier-object format 302); an action 304 action 304 format (action-action format 302); a condition 312 action 304 format (condition-action format 302); a modifier 308 noun 314 format (modifier-noun format 302); or a state 310 state 310 format (state-to-state format 302). Word order may vary within a given format, as it varies within natural languages, e.g., a modifier 308 may precede or follow a noun 314 in a modifier-noun format 302. A given name may match more than one format 302. In some embodiments an exact match is required, but in general a partial match is presumed sufficient. In an exact match every part of the name maps to a respective format constituent. For instance, when Red, Yellow, and Green are states 310, the name RedYellowGreen is an exact match to a state-state-state format but is only a partial match to a state-state format and is not a match to an action-state format because it contains no action.

A few of the many possible examples of names 204 which conform with a name format 302 are shown below.

action-object format: "CheckForNull" (action is CheckFor, object is Null), "FindDaysInMonth" (action is Find, object is DaysInMonth)

action-modifier-object format: "CheckForNullArticle" (action is CheckFor, modifier is Null, object is Article)

action-action format: CheckArticleNullThrowException (actions are Check and Throw)

condition-action format: IfNullArticleThrowException (condition is IfNullArticle, action is Throw)

modifier-noun format: ControllerTemplate (modifier is Controller, noun is Template), DataObjectTemplate (modifier is DataObject, noun is Template), PersonController (modifier is Person, noun is Controller)

state-to-state format: FahrenheitToCelsius, CelsiusToFahrenheit (states are Fahrenheit and Celsius)

As an example, a name "NewIntegerMethod" is a better name than "NewMethod" for a newly created method that returns an integer value, because NewIntegerMethod distinguishes 802 the new method from other methods that return a different data type than integer, whereas "NewMethod" does not provide that distinction between methods. Likewise, giving new methods respective numbers 320, e.g., "NewMethod001", "NewMethod002" and so on is better than reusing "NewMethod" each time. But neither the mere inclusion of a data type name 324 nor the mere inclusion of a sequence index 320 is optimal. Other approaches taught herein are better at generating meaningful names, such as names adhering to name formats 302 and names based on context such as a natural language description 416 of an artifact or a conditional statement 410 of an artifact.

Accordingly, in some embodiments the generated name 204 distinguishes 802 the particular software development artifact from other software development artifacts in the category 214 by more than a data type 322 and by more than an index into a sequence 316 of names.

Other system embodiments are also described herein, either directly or derivable as system versions of described processes or configured media, duly informed by the extensive discussion herein of computing hardware.

Although specific artifact name generation architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of machine learning models for name generation functionality, for example, as well as different technical features, aspects, mechanisms, software, expressions, hierarchies, operational sequences, data structures, environment or system characteristics, or other functionality consistent with teachings provided herein, and may otherwise depart from the particular examples provided.

Processes (a.k.a. Methods)

Methods (which are also be referred to as "processes" in the legal sense of that word) are illustrated in various ways herein, both in text and in drawing figures. FIGS. 6, 7, and 8 each illustrate a family of methods 600, 700, and 800 respectively, which are performed or assisted by some enhanced systems, such as some systems 202 or another artifact name generation enhanced system as taught herein. Method family 600 is a proper subset of method family 800. Method family 700 is another proper subset of method family 800.

FIGS. 1 to 5 illustrate artifact name generation system 202 architectures with implicit or explicit actions, e.g., parsing source code to identify a conditional statement 410, scanning an autocompletion 220 database of identifiers 404 to see whether a generated name 204 is already in use, scanning a list of unit test 514 identifiers (or template 512 identifiers, or file 516 identifiers, etc.) to see whether a generated artifact name 204 is already in use, training a model 222 for artifact name generation, or otherwise processing data 118, in which the data 118 includes, e.g., source code 402, textual descriptions 416, sets of data type categories 214 or algorithm categories 420, and project 412 metadata, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types in source code 402. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 8. FIG. 8 is a supplement to the textual examples of embodiments provided herein and the textual descriptions of embodiments provided herein. In the event of any alleged inconsistency, lack of clarity, or excessive breadth due to an aspect or interpretation of FIG. 8, the text of this disclosure shall prevail over that aspect or interpretation of FIG. 8.

Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 800 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 8 to be non-operable, the sequence S is not within the scope of any claim. Any assertion otherwise is contrary to the present disclosure.

A given artifact name generation architecture may be described from at least two perspectives, namely, from outside a module that includes a trained machine learning model 222 such as a neural net, or from within such a module. In some embodiments, the module and the model 222 are the same, while in other embodiments a distinction may be made, e.g., by defining the model 222 boundary as the boundary of a neural net (for instance) and interposing additional processing (e.g., spell-checking code) on the output of the neural net before passing 706 a name out of the module to serve as a result of a code editor tool's invocation 602 of name generation 206 functionality.

However, from the outside-the-model perspective of that invocation, the spell-checker code (for instance) and the neural net (for instance) form a unitary module. Accordingly, unless stated otherwise, the model 222 includes at least a trained machine learning model per se. In some embodiments model 222 also includes code 226 for processing model output to refine or filter names 204, e.g., code which upon execution performs one or more of: spell checking 836, style checking 832, keyword filtering 830, confidence filtering 826, or formatting 804. In some embodiments model 222 also includes code 226 for processing model input to refine or filter context 216, e.g., code which upon execution performs one or more of: source code parsing, algorithm category recognition, code summarization, or text summarization.

In particular, the architecture shown in FIG. 2 includes at least the following variations. In a first variation, only a trained model 222 per se (e.g., a neural net) is present; no output processing code 226 is present. In a second variation, a trained model 222 per se is present and output processing code 226 is also present in an execution path between the output interface of the model per se and the tool 210 code that receives 604 the result 204 of the invocation 602 of the name generation model 222 by the tool 210. In a third variation, a trained model 222 per se is present and output processing code 226 is also present in the tool 210 code, and the output processing code refines or filters the result 204 of the invocation 602 of the name generation model 222 by the tool 210. That is, the output processing code 226 may reside in a module containing the model 222 per se, or the output processing code 226 may reside in the tool 210 outside that module, or the embodiment may lack any such output processing code 226. Regardless, module 222 refers herein to the model per se in operational combination with the output processing code 226, if any, and regardless of where the output processing code 226 resides. Input processing code 226 may likewise reside in the same module as the model 222 per se, or reside elsewhere in an enhanced tool 210, or not be present, depending on the embodiment.

Some embodiments provide or utilize a software development method. The method is performed by a computing system 202 to generate an artifact name 204. The method includes getting 702 a context 216 of a particular software development artifact 124, the particular software development artifact belonging to a category 214 which also includes a plurality of other software development artifacts. The particular software development artifact is part of a project 412 which has non-comment source code 406. The method also includes generating 704 a name 204 based on at least a portion of the context. The name distinguishes 802 the particular software development artifact from other software development artifacts in the category. The name also does not occur elsewhere in the non-comment source code of the project. The method also includes providing 706 the name or a derivation 708 of the name as a candidate name of the particular software development artifact.

As to categories 214, some examples are shown in FIG. 5. That is, a particular method 502 belongs to a methods category 214, a particular argument 504 belongs to an arguments category 214, a particular exception 506 belongs to an exceptions category 214, and so on for each item in FIG. 5. Particular embodiments may define different or additional categories 214 for particular circumstances, e.g., any or all of the following may also or instead be a category 214: APIs, blobs, coding patterns, connections, databases, endpoints, images, links, microservices, nodes, objects, services, threads, or virtual machines.

The placeholder name "NewMethod" does not distinguish 802 any particular method from other members of the methods category 214 because it does not provide a distinction between methods in the scenarios where such a distinction matters. As a placeholder, it is repeatedly assigned (albeit temporarily) to multiple methods, and it does not remain in the source code development context long enough (except by mistake) to face scenarios in which the distinction 802 matters, such as static analysis, compilation, debugging, profiling, performance testing, or deployment to production use.

In some embodiments, the method generates artifact names from artifact descriptions. This may be done in at least two different ways. One way to generate 704 an artifact name is to obtain a textual description 416 of the artifact and then derive 808 the name from the textual description. In general, the textual description could be generated from source code, or the textual description could be human-created.

In some embodiments, the description is human-written or automatically produced, or both, and the artifact does not necessarily include source code. In particular, text of any patent, and non-patent text, may be part or all of a description 416, assuming that appropriate respect is paid to any copyright, privacy, or other legal rights associated with the text 416.

For example, the artifact could be a patent drawing figure embedded in a patent or a product specification, with the human-written description 416 being or including the drawing figure's description text in the patent: "FIG. 1 illustrates a flowchart of a method for assisting automation of repeated edits of code, in accordance with the principles described herein;" this is from U.S. patent Ser. No. 10/996,930 ("cited patent"). The generated name could then be, e.g., "Automation Edits Flowchart" or "Repeated Edits Flowchart". This example merely uses part of the cited patent's text as input for name generation; there is no need or intention herein to incorporate any or all of the cited patent by reference for enablement, written description, best mode, or similar legal support or for legal compliance with patentability requirements or to make or support any claim of priority to the cited patent. This paragraph may be removed in jurisdictions which constrain, discourage, punish, or prohibit mention of a different patent disclosure within a given patent disclosure.

In some embodiments, generating the name includes obtaining 806 a natural language textual description 416 of the particular software development artifact, and deriving 808 the name from the natural language textual description.

In some embodiments, the description is automatically produced from artifact source code. As an example, some embodiments generate a name when extracting a particular switch statement into a method. Assume execution of a particular example switch statement yields a result value which is the number of days in a month (January has 31, February has 28 or 29 depending on the year, etc.). A code summarizer 810 given the switch statement produces an English description that begins "The code is a switch statement that is used to determine the number of days in each month." From that description the name generation model then derives 808 an extracted method name such as "DetermineNumberOfDays" or "FindDaysInMonth".

In some embodiments, generating the name includes summarizing 810 a source code of the particular software development artifact, thereby obtaining 806 a natural language textual description 416, and deriving 808 the name from the textual description.

Some embodiments generate a name based on a conditional statement 410. In one example, the artifact includes source code being extracted into a method, the source code starts "if (article==null)", and the generated method name is "IfArticleNull" or "CheckForNullArticle" or a similar name.

As another example, assume code in an artifact (whether an extracted method or another artifact) includes a conditional statement along the lines of "if (article==null) then throw new RESTexception HTTPStatusCode NotFound". Some embodiments locate 812 the conditional statement and derive 814 one or more of the following candidate names 204 from the conditional statement: CheckForNull, CheckForNullArticle, CheckForArticleNull, CheckIfArticleIsNull, IfNullArticle ThrowException, CheckArticleNullThrowException, ExceptionOnNull, WhenNullArticleThrowRESTException. Each of these generated names is more specific and more reflective of the artifact's functionality than "NewMethod" or another placeholder name. Hence, each is more meaningful than a placeholder.

In some embodiments, generating 704 the name includes locating 812 a conditional statement in source code of the particular software development artifact, and deriving 814 the name from the conditional statement. The conditional statement is located 812 by parsing or abstract syntax tree traversal, for example. Then the name is derived 814 by parsing or pattern matching, for example, and stylistic transformations such as capitalization and white space removal.

Some embodiments generate a name based on recognizing source code. For example, suppose the artifact includes source code being extracted into a method, and the source code is the same as, or similar to, a known kind of algorithm such as a sorting, searching, hashing, merging, clustering, compression, string metric, or another kind of algorithm 418. In this case, some models 222 generate a method name that includes "Sort", "Search", "Hash", etc. together with a noun such as a name of a variable that is being sorted, searched, etc. The model 222 would have been trained on labeled examples of each kind of algorithm.

In some embodiments, generating 704 the name includes mapping 816 a source code of the particular software development artifact to an algorithm category 420, selecting 818 an identifier 404 from the source code of the particular software development artifact, and deriving 820 the name from the algorithm category and the identifier.

Although many of the examples herein involve naming a newly created artifact, the teachings may also be beneficially applied after an artifact is updated. Updates may alter the artifact in a way that makes the pre-update name less meaningful, or even incorrect, as a name for the updated artifact. In one example, a method's pre-update name is CheckForNullArticle but after the method received that name some code in the method is updated to replace "article" with "object". Applying teachings herein, an embodiment generates a candidate name CheckForNullObject from the updated source code. In response to determining that the two names are different, an enhanced tool 210 proactively suggests 606 CheckForNullObject as an updated name for the method.

Some embodiments perform the following prior to providing the generated name or a derivation of the generated name as a candidate name: finding 822 a current name of the particular software development artifact, and ascertaining 824 that the generated name differs from the current name. The current name is found 822 by searching the artifact itself, metadata of the artifact, or a list of artifact identifiers, for example. The existence of a difference between the names is ascertained 824, e.g., by string comparison or hash comparison.

Names may be generated 704 for various kinds of artifacts 124. In some embodiments, the particular software development artifact includes at least one of: a method 502, a method argument 504, an exception 506, a variable 508, a class 510, a template 512, a unit test 514, or a file 516. Any other digital resource known in the art or noted herein, or both, may also be an artifact 124, including for instance an item associated with an artifact category 214, e.g., API, blob, coding pattern, connection, database, endpoint, image, link, microservice, node, object, service, thread, or virtual machine.

In some embodiments a model 222 per se generates a suitable candidate names 204, e.g., the name generated by the neural net or other trained model is provided 706 directly to the tool 210. But in other embodiments, some additional processing is done by code 226 to refine or filter the model 222 output before providing 706 a name (or several names) to the tool 210. For example, in some embodiments output is spell-checked 836 to filter out nonsense strings such as "Xzrysun" and to filter out strings that coincidentally or otherwise contain or resemble misspellings such as "CheckFir" or "BildObjectList". In some embodiments, output is style-checked 832 for capitalization rule compliance, use of approved abbreviations or avoidance of abbreviations, minimum length compliance or maximum length compliance, or other stylistic criteria. If the model associates a confidence 224 with a generated name, then the confidence is used in some embodiments as a filter, e.g., to avoid suggesting 606 generated names that have confidence below a threshold 828. Some embodiments compare 830 generated names to keywords 326 to exclude certain words, e.g., programming language reserved words, company names, customer names, brand names, and profanity.

Some embodiments perform the following prior to providing the generated name or a derivation of the generated name as a candidate name: spell-checking 836 the generated name, style-checking 832 the generated name, comparing 826 a model confidence of the generated name to a threshold, or comparing 830 the generated name to a set of keywords.

Some embodiments submit 602 context of an artifact to an AI model 222, receive 604 a name from the model, and suggest 606 that name via an interface 212 as a name for the artifact. For example, generated names may be displayed in a dropdown list or other list, or as grey text.

Some embodiments produce 706 names that are not available from mechanisms such as autocompletion or a generic "NewMethod" name generated by a conventional extract method tool; exclusion of names available from these other mechanisms may be inherent in the model 222, or may be a result of filtering by code 226, depending on the embodiment.

In some embodiments, the filtering and refinement code 226 excludes one or more of the following (depending on the particular embodiment) to prevent them from being provided 706 for presentation 606 to a developer:
a) A generic name such as "NewMethod" that is a placeholder the user will replace.
b) A type-based but otherwise generic name such as "CalculateInteger".
c) A name already used someplace else in the relevant codebase, e.g., in the project 412 under development, or in a specified repository.
d) In particular, a name suggested by autocompletion which is based on the relevant codebase.
e) A name generated by conforming a block of pasted code to the surrounding code; the conforming includes modifying the pasted code to use an identifier already present in the code around the pasted code.
f) A name generated by the act of pasting in a block of code, or by a find-replace operation, e.g., a name given to code that was just pasted into the document to be used in the communication with the user.
g) A name generated by inserting a template that uses or contains the name.
h) A name generated by the user typing in the name or pasting in the name.

Some embodiments provide or utilize a software development method performed by a computing system to generate an artifact name. The method includes: submitting 602 a context 216 of a particular software development artifact 124 to a trained machine learning model 222, the particular software development artifact belonging to a category 214 which also includes a plurality of other software development artifacts; receiving 604 from the trained machine learning model a generated name, wherein the generated name distinguishes 802 the particular software development artifact from other software development artifacts in the category, and is not available in the computing system via autocompletion 220; and presenting 606 the generated name as a candidate name of the particular software development artifact.

In some embodiments, submitting 602 the context includes submitting 602 at least one of the following: source code 402 of at least a portion of the particular software development artifact; source code 402 in a file 516 containing the particular software development artifact; or documentation 414 describing at least an aspect of the particular software development artifact. Some examples of documentation 414 include natural language text, comments 408 in source code, strings embedded in the source code, e.g., strings in print statements or logging calls, and metadata of utilized APIs.

In some embodiments, names can be generated regardless of whether autocompletion 220 is available. In a system that has autocompletion, some embodiments execute code 226 to ensure that the generated name is not available via autocompletion. In a system that lacks autocompletion, requiring that the generated name is not available via autocompletion is inherent, but some embodiments also require that the generated name not already be present in the project source code. An exception in some embodiments is that a generated name can already be already present in the project source code if it's only present in a comment 408. Comments 408 can be fed 602 to the model as input context for name generation. Since comments are often part of source code, the term "non-comment source code" 406 is used herein to mean source code that is not inside a comment.

In some embodiments, the particular software development artifact is part of a project 412 having non-comment source code 406, and receiving 604 the generated name includes receiving a name which does not occur elsewhere in the non-comment source code of the project. In some embodiments, the particular software development artifact is part of a project 412 having non-comment source code 406, and the generated name does not occur elsewhere in the non-comment source code of the project.

In some embodiments, receiving 604 the generated name includes receiving a name which matches at least one of the following name formats: an action-object format (e.g., CheckForNull, FindDaysInMonth), an action-modifier-object format (e.g., CheckForNullArticle), an action-action format (e.g., CheckArticleNullThrowException), a condition-action format, (e.g., IfNullArticleThrowException), a modifier-noun format (e.g., ControllerTemplate, DataObjectTemplate, PersonController), or a state-to-state format (e.g., FahrenheitToCelsius, CelsiusToFahrenheit). Code 226 refines pieces of text to form such names.

In some embodiments, receiving 604 the generated name includes receiving a name which does not match any of the following name formats: a modifier-category format (e.g., NewMethod), an action-datatype format (e.g., CalculateInteger), or a root-index format (e.g., PastedBlock0001). If such names occur, then code 226 filters them out.

In some embodiments, receiving 604 the generated name includes receiving a name which does not include any of the following: a word "new" or a synonym of the word "new", a datatype (a.k.a. data type) 322 identifier 324, or a sequence 316 index 320. If such names occur, then code 226 filters them out.

In some embodiments, the particular software development artifact 124 is not any of the following: a block 518 of pasted code, a class 510, or a file 516. Names are not generated for such artifacts, or are supplied by other mechanisms such as autocompletion 220, code synthesis, or scripts.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as user interface 212 instructions 116, trained models 222, artifact category data structures 214, algorithm category data structures 420, name or context filtering or refining code 226, code summarizers 810, and artifact name format 302 enforcement software 208, in the form of data 118 and instructions 116, read from a removable storage medium 114 and/or another source such as a network connection, to form a configured storage medium. The configured storage medium 112 is capable of causing a computer system 202 to perform technical process steps for providing or utilizing artifact name generation functionality 208, as disclosed herein. The Figures thus help illustrate configured storage media embodiments and process (a.k.a. method) embodiments, as well as system and process embodiments. In particular, any of the process steps illustrated in FIGS. 6 to 8, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform an interaction method. This method includes any of the methods described herein, e.g., an method consistent with FIG. 6, FIG. 7, or FIG. 8.

Additional Observations

Additional support for the discussion of artifact name generation functionality 208 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Some embodiments provide or utilize name generation on code patterns. Code patterns can be given a descriptive name based on what they do. When code is synthesized, transformed, extracted, or changed, naming a block or method can be used to aid user experience by being offered as a suggestion for the resulting block or method. For instance, some embodiments suggest a name for an extracted method, for arguments of a method, for variables in a method, or for code templates based on examples in a user's codebase. Some embodiments detect inconsistency between the changed content of a method the method's name, and in response generate and suggest a more consistent name that reflects the change. Some embodiments suggest names for unit tests. Some embodiments suggest names for new templates.

The generation of a meaningful name adds value for the user in various ways. It relieves the user of the burden of devising and typing in a meaningful name for an artifact. It gives the user evidence that the tool recognizes intent of the user when the user makes a code change.

Some embodiments use machine learning or other AI when generating candidate names for variables, types, and type members during various coding activities, such as refactoring, cutting and pasting snippets of code, etc. Some embodiments generate names for a code artifact based on what the code artifact does or will do upon being executed. These names are more meaningful than names that merely look at general context such as a single data type.

Technical Character

The technical character of embodiments described herein will be apparent to one of ordinary skill in the art, and will also be apparent in several ways to a wide range of attentive readers. Some embodiments address technical activities such as executing a machine learning model 222, parsing source code 402 to locate non-comment code 406 or conditional statements 410, presenting 606 candidate names in a user interface 212, and executing a code summarizer 810, which are each an activity deeply rooted in computing technology. Some of the technical mechanisms discussed include, e.g., trained machine learning modules 222, name or context filtering or refining code 226, artifact name format 302 enforcement code 208, conditional statement 410 location 812 code 208, and tool user interfaces 212. Some of the technical effects discussed include, e.g., relieving developers of the burden of devising artifact names by proactively and automatically generating 704 and presenting 606 artifact names based on artifact functionality per artifact code 402 or descriptions 416, updating artifact names when artifact functionality changes, and filling gaps in automatic name generation left by mechanisms such as autocompletion 220 and default placeholder name suppliers. Thus, purely mental processes and activities limited to pen-and-paper are clearly excluded. Other advantages based on the technical characteristics of the teachings will also be apparent to one of skill from the description provided.

Different embodiments provide different technical benefits or other advantages in different circumstances, but one of skill informed by the teachings herein will acknowledge that particular technical advantages will likely follow from particular innovation features or feature combinations, as noted at various points herein. Any generic or abstract aspects are integrated into a practical application such as standalone source code editing tools 210, integrated development environment editors 210, and repository tools 210, in which artifacts 124 are either created or updated or both, and thus an opportunity or requirement for artifact naming occurs. Name updating (a.k.a. renaming) is a form of naming, herein.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to provide a newly extracted method with a name that is more meaningful than "NewMethod", how to improve software maintainability, how to fill artifact naming gaps left by autocompletion, and how to reduce inconsistencies between method names and method functionality when methods are modified. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

AI: artificial intelligence
ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Artifact naming operations such as submitting 602 digital data as context 216, executing a machine learning model 222 to generate 704 an artifact name, presenting 606 a name in a user interface 212, and many other operations discussed herein, are understood to be inherently digital. A human mind cannot interface directly with a CPU or other processor, or with RAM or other digital storage, to read and write the necessary data to perform the artifact naming interaction steps 800 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as ascertaining, checking, comparing, deriving, distinguishing, generating, getting, locating, mapping, matching, obtaining, presenting, providing, receiving, selecting, submitting, summarizing (and ascertains, ascertained, checks, checked, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware 102 computer system, also referred to as a "computational system" or "computing system", and when in a network may be referred to as a "node"

104 users, e.g., user of an enhanced system 202

106 peripheral device 108 network generally, including, e.g., LANs, WANs, software-defined networks, clouds, and other wired or wireless networks 110 processor; includes hardware 112 computer-readable storage medium, e.g., RAM, hard disks 114 removable configured computer-readable storage medium 116 instructions executable with processor; may be on removable storage media or in other memory (volatile or nonvolatile or both)

118 digital data in a system 102; data structures, values, source code, and other examples are discussed herein 120 kernel(s), e.g., operating system(s), BIOS, UEFI, device drivers 122 tools and applications generally, e.g., cybersecurity tools, software development tools, office productivity tools, social media tools, games, email and other communication tools, and so on; services are an example of tools 124 artifact in a computing system; digital or computational or both 126 display screens, also referred to as "displays"

128 computing hardware not otherwise associated with a reference number 106, 108, 110, 112, 114

130 cloud, also referred to as cloud environment or cloud computing environment 202 enhanced computing system, i.e., system 102 enhanced with artifact name generation functionality as taught herein 204 artifact name; digital 206 artifact name generation; computational activity or a result thereof 208 artifact name generation functionality, e.g., software or specialized hardware which performs or is configured to perform steps 602 and 604, or step 704, or steps 806 and 808, or steps 812 and 814, or steps 816-820, or any software or hardware which performs or is configured to perform a novel method 800 or a computational artifact name generation activity first disclosed herein 210 software development tool, e.g., version control systems, diagnostics, editors, viewers, browsers, integrated development environments, build tools, integration tools, deployment tools, testing tools, debugging tools, profiling tools 212 user interface; software 214 artifact category, as represented in a computing system 202
216 artifact context, as represented in a computing system 202
220 autocompletion mechanism, or computational activity of such a mechanism, or digital result of such computational activity; as used herein, "autocompletion" is based on a list, database, or other set of previously used identifiers; these identifiers include reserved words of a programming language as well as variable names, class names, data type names, method names, etc. that are in a source code but are not programming language reserved words; thus, autocompletion offers suggestions based on previously used identifiers; by definition, autocompletion excludes generation of identifiers which are new to a project codebase
222 trained machine learning model, e.g., neural net, decision tree, support vector machine, or other artificial intelligence computational mechanism; trained by supervised, semi-supervised, or unsupervised learning, to generate artifact names based on context which reflects artifact functionality, e.g., source code of an artifact or description 416 of an artifact
224 confidence value provided by some models 222 along with respective generated names; digital
226 software which upon execution refines or filters (or both) model 222 output, e.g., to match a format 302, spell-check, style-check, confidence-filter, etc., or refines or filters (or both) model 222 input, e.g., summarizing 810 source code of a supplied context, locating 812 a conditional statement in a context, or selecting 818 an identifier from a context
302 artifact name format, as represented and computationally enforced in a computing system 202
304 action word, e.g., verb, in a format 302
306 object word, e.g., target of an action, in a format 302
308 modifier word, e.g., adjective or adverb, in a format 302
310 state word, e.g., identifying a result of an action or a state of being, in a format 302
312 condition word or phrase, e.g., corresponding to a condition of a conditional statement 410, in a format 302
314 noun in a format 302
316 sequence of identifiers, characterized by a root 318 and incremental index 320, e.g., temp001, temp002, temp003 has root "temp" and integer indexes, whereas AATargetMethod, ABTargetMethod, ACTargetMethod has root "TargetMethod" and alphabetic indexes
322 data type in software; may be a built-in data type such as Int or Float, or a user-defined data type such as a class
324 name of a data type; digital
326 keyword, reserved word, dictionary word, prohibited word, or other word in a predefined list; digital
402 source code; digital
404 identifier string as represented in a system 202
406 non-comment code as represented in a system 202
408 comment in code 402 as represented in a system 202
410 conditional statement in code 402 as represented in a system 202, e.g., if statement, switch statement, loop statement, jump table, exception try catch statement
412 project as represented in a system 202; project scope determines a codebase
414 document or documentation of software; digital
416 textual description of at least one particular artifact or at least one particular artifact category 214; digital and includes natural (non-programming) language
418 algorithm as represented in a system 202
420 algorithm category as represented in a system 202
502 method as represented in a system 202; may also be referred to as a function or a procedure
504 method argument as represented in a system 202; may also be referred to as a parameter
506 exception as represented in a system 202; may also be referred to as a handler
508 variable as represented in a system 202
510 programming language class as represented in a system 202; may also be referred to as an object definition
512 software template as represented in a system 202; may also be referred to as a pattern
514 test as represented in a system 202
516 file as represented in a system 202
518 code block as represented in a system 202, e.g., a set of contiguous lines of source code
600 flowchart; 600 also refers to artifact naming interaction methods (a.k.a. "artifact naming operation methods", or "artifact naming methods", or "artifact name generation methods", or "name generation methods) that are illustrated by or consistent with the FIG. 6 flowchart
602 computationally submit an artifact context 216 directly or indirectly to a model 222, e.g., via an API
604 computationally receive one or more artifact candidate names, directly or indirectly, from a model 222, e.g., via an API
606 computationally present in a user interface 212 one or more artifact candidate names, e.g., by configuring a display 126
700 flowchart; 700 also refers to artifact naming interaction methods that are illustrated by or consistent with the FIG. 7 flowchart
702 computationally get an artifact context 216, e.g., via an API
704 computationally generate one or more artifact candidate names by executing a model 222
706 computationally provide to other code one or more generated artifact candidate names, e.g., via an API
708 computational derivation of a model-generated name or result thereof, e.g., when the model 222 generates "if article equals null" then some of the derivations 708 include "IfArticleNull", "CheckForNullArticle", "CheckArticle", and "CheckForNull"
800 flowchart; 800 also refers to artifact naming methods that are illustrated by or consistent with the FIG. 8 flowchart, which incorporates the FIG. 6 flowchart and the FIG. 7 flowchart and other steps taught herein
802 computationally distinguish an artifact from other artifacts, e.g., from other artifacts in the same category 214, by associating a name 204 with the artifact that is different than the names associated with the other artifacts in a system 202
804 computationally match a string to a name format 302, e.g., by lexical analysis, pattern matching, string transformation, lookup, truncation, rearrangement of substrings, padding, and other string operations
806 computationally obtain a natural language description 416, e.g., via an API
808 computationally derive an artifact name from a description 416, e.g., by computationally summarizing the description and computationally matching the result to a format 302; an example of derivation 708

810 computationally summarize source code to form a description 416, e.g., using a neural sequence-to-sequence model, neural attention model, or other AI mechanism; 810 also refers to code which performs such summarization

812 computationally locate a conditional statement in code, e.g., by lexical analysis and parsing, or traversal of an abstract syntax tree

814 computationally derive an artifact name from a conditional statement 410, e.g., by matching tokens from the conditional statement to positions in a format 302, e.g., for "IF article==null THEN" the reserved word IF is matched to "CheckFor", the identifier "article" on the condition's LHS is matched to "Article", the operator "==" and the identifier "null" on the condition's RHS are matched to "Null", and the tokens as a group are matched to "CheckForArticleNull"; LHS means left hand side, RHS means right hand side; an example of derivation 708

816 computationally map some source code to an algorithm category, e.g., by using an AI model trained by data pairs that each include an algorithm category identification and an example of source code in the identified category, or by using a code summarizer and then scanning the code summary for algorithm-identifying words, or both

818 computationally select an identifier in source code, e.g., by parsing, or by using an abstract syntax tree or a compiler-generated symbol table

820 computationally derive an artifact name from an algorithm category plus an identifier, e.g., by matching them to positions in a format 302 to generate names such as SortEmployeeList (action-object format where action is Sort category 420 and identifier is EmployeeList), or SearchTreeHashImage (action-noun-action-noun format where actions are algorithm categories 420 Search and Hash, and nouns are identifiers Tree and Image); an example of derivation 708

822 computationally find an artifact's current name, e.g., by lexical analysis, parsing, abstract syntax tree search, or symbol table lookup 824 computationally ascertain a difference between an artifact's current name (which may have been assigned prior to changes in the artifact's functionality) and a generated 704 candidate name for the artifact which reflects the artifact's current functionality, e.g., by string comparison or by calculating a string distance metric such as a Levenshtein distance

826 computationally compare a model-provided confidence 224 (which is associated by the model with a generated 704 name) to a threshold value 828, to filter out generated names that the model indicates low confidence in, thereby refining model output before suggesting generated name(s) to a developer

828 threshold value; numeric, digital

830 computationally compare a generated name to a set of keywords 326, e.g., by string comparison (which includes substring matching)

832 computationally check a generated name against style criteria 834, e.g., using string length calculations and string comparison

834 name style criteria as represented in a system, e.g., length criteria, capitalization criteria, absence or presence of listed word 326 criteria, or word order (e.g., noun then modifier versus modifier then noun) criteria; "criteria" herein includes the singular and the plural

836 computationally spell-check a generated name, e.g., to catch dialect variations, letter transpositions, or errors from concatenation or other string operations

838 spelling of a name, as represented in a system 202

840 any step or item discussed in the present disclosure that has not been assigned some other reference numeral; 840 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments use specialized machine learning models 222 to generate 704 computing system artifact names 204 which reflect actions 304, states 310, conditions 312, or other aspects of artifact 124 functionality. Artifact 124 creation mechanisms 210 such as method extraction mechanisms, test creation mechanisms, and template extraction mechanisms are enhanced with functionality 208 by which they obtain 604 and suggest 606 meaningful generated names 204 for new artifacts 124 instead of merely prompting users with placeholder names. Specified artifact name formats 302 and name styles 834 are matched 804 during name generation 704, thereby improving code maintainability and software development efficiency. Generated names 204 are automatically and proactively derived 808, 814, 820 from artifact source code 402 by code summarization 810, conditional statement 410 location 812 and parsing, algorithm 418 category 420 recognition 816, or name format 302 matching 804, for example. Generated names 204 are also derived 808 from natural language descriptions 416 in comments 408 and other documentation 414. Naming gaps left by autocompletion mechanisms 220 are reduced. Inconsistencies between updated artifacts 124 and their names are detected 824 and remedied 706.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A software development computing system, comprising:
   a digital memory;
   a processor set including at least one processor, the processor set in operable communication with the digital memory; and
   a software development tool which upon execution by the processor set submits a context of a particular software development artifact to a trained machine learning model, the particular software development artifact belonging to a category which also includes at least one other software development artifact, the tool receives from the trained machine learning model a generated name which is generated by the trained machine learning model based on at least a context of the particular software development artifact and the tool presents the generated name in a user interface as a candidate name of the particular software development artifact, wherein during a compilation and during an execution of a program build containing a compilation result the generated name distinguishes the particular software development artifact from at least one other software development artifact in the category, wherein the generated name is not available in the computing system via autocompletion, the generated name is not generated by conforming a block of pasted code to a surrounding code, and the generated name is not generated by or in response to an act of pasting in a block of code.

2. The computing system of claim 1, further comprising the trained machine learning model.

3. The computing system of claim 1, wherein the digital memory is configured by the generated name, and the generated name matches at least one of the following name formats:
   an action-object format;
   an action-modifier-object format;
   an action-action format;
   a condition-action format;
   a modifier-noun format; or
   a state-to-state format.

4. The computing system of claim 1, wherein the generated name distinguishes the particular software development artifact from other software development artifacts in the category by more than a data type and by more than an index into a sequence of names.

5. A software development method performed by a computing system which includes a trained machine learning model to generate an artifact name, the method comprising:
   getting a context of a particular software development artifact by using an abstract syntax tree or a compiler-generated symbol table, the particular software development artifact belonging to a category which also includes a plurality of other software development artifacts, the particular software development artifact being part of a project having non-comment source code;
   the trained machine learning model generating a name, the generating based on at least a portion of the context, wherein during a compilation and during an execution of a program build containing a compilation result the name distinguishes the particular software development artifact from at least one other software development artifact in the category, and the name does not occur elsewhere in the non-comment source code of the project and the name does not occur in a block of source code pasted into a source code containing the particular software development artifact; and
   providing the name or a derivation of the name as a candidate name of the particular software development artifact.

6. The method of claim 5, wherein generating the name comprises:
   obtaining a natural language textual description of the particular software development artifact; and
   deriving the name from the natural language textual description.

7. The method of claim 5, wherein generating the name comprises:
   summarizing a source code of the particular software development artifact, thereby obtaining a natural language textual description; and
   deriving the name from the textual description.

8. The method of claim 5, wherein generating the name comprises:
   locating a conditional statement in source code of the particular software development artifact; and
   deriving the name from the conditional statement.

9. The method of claim 5, wherein generating the name comprises:
   mapping a source code of the particular software development artifact to an algorithm category;
   selecting an identifier from the source code of the particular software development artifact; and
   deriving the name from the algorithm category and the identifier.

10. The method of claim 5, further comprising the following prior to providing the generated name or a derivation of the generated name as a candidate name:
    finding a current name of the particular software development artifact; and
    ascertaining that the generated name differs from the current name.

11. The method of claim 5, wherein the particular software development artifact comprises at least one of:
    a method;
    a method argument;
    an exception;
    a variable;
    a class;
    a template;
    a unit test; or
    a file.

12. The method of claim 5, further comprising at least one of the following prior to providing the generated name or a derivation of the generated name as a candidate name:
    spell-checking the generated name;
    style-checking the generated name;
    comparing a model confidence of the generated name to a threshold; or
    comparing the generated name to a set of keywords.

13. A software development method performed by a computing system to generate an artifact name, the method comprising:
    submitting a context of a particular software development artifact to a trained machine learning model, the particular software development artifact belonging to a category which also includes at least one other software development artifact;

receiving from the trained machine learning model a generated name, wherein the generated name distinguishes the particular software development artifact from at least one other software development artifact in the category in at least one of: a static analysis of a source code which contains the generated name, a compilation of a source code which contains the generated name, an execution of a program build containing a compilation result of the compilation of the source code which contains the generated name, or a debugging of a program build from at least a source code which contains the generated name, and wherein the generated name is not available in the computing system via autocompletion and the generated name is not available in the computing system via automated conformance of pasted code; and presenting the generated name as a candidate name of the particular software development artifact.

14. The method of claim 13, wherein submitting the context comprises submitting at least one of the following:
source code of at least a portion of the particular software development artifact;
source code in a file containing the particular software development artifact; or
documentation describing at least an aspect of the particular software development artifact.

15. The method of claim 13, wherein the particular software development artifact is part of a project having non-comment source code, and receiving the generated name comprises receiving a name which does not occur elsewhere in the non-comment source code of the project.

16. The method of claim 13, wherein:
the particular software development artifact is part of a project having non-comment source code; and
the generated name does not occur elsewhere in the non-comment source code of the project.

17. The method of claim 13, wherein receiving the generated name comprises receiving a name which matches at least one of the following name formats:
an action-object format;
an action-modifier-object format;
an action-action format;
a condition-action format;
a modifier-noun format; or
a state-to-state format.

18. The method of claim 13, wherein receiving the generated name comprises receiving a name which does not match any of the following name formats:
a modifier-category format;
an action-datatype format; or
a root-index format.

19. The method of claim 13, wherein receiving the generated name comprises receiving a name which does not include any of the following:
a word "new" or a synonym of the word "new";
a datatype identifier; or
a sequence index.

20. The method of claim 13, wherein the particular software development artifact is not any of the following:
a block of pasted code;
a class; or
a file.

* * * * *